Dec. 5, 1967   H. KUNZE   3,355,987
VIEWING SYSTEM FOR A COMBAT VEHICLE
Filed March 21, 1966   2 Sheets-Sheet 1

INVENTOR.
Herbert Kunze
BY
James E. Bryan
ATTORNEY

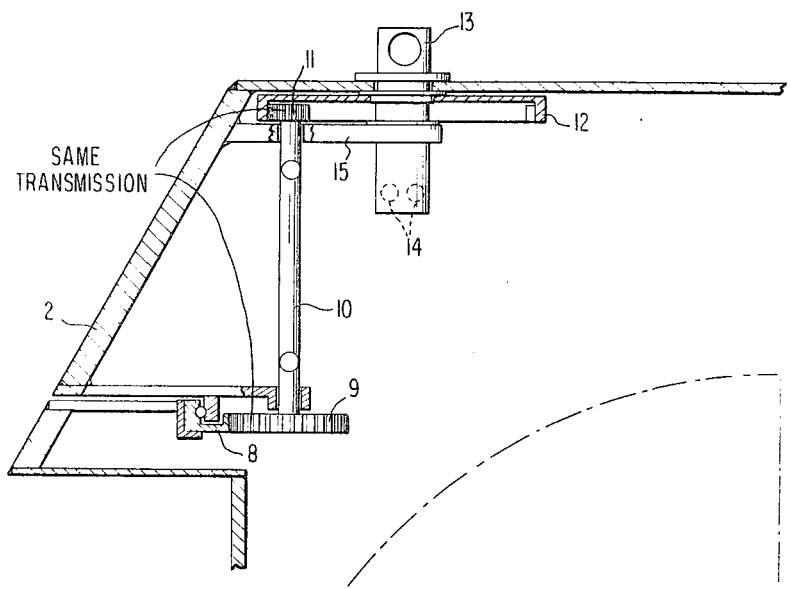
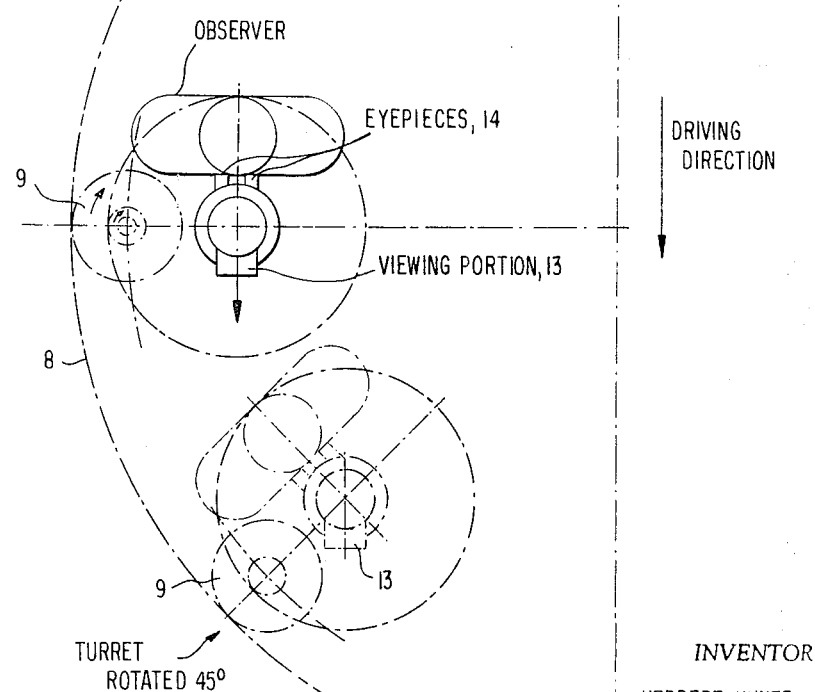

3,355,987
VIEWING SYSTEM FOR A COMBAT VEHICLE
Herbert Kunze, Kassel, Germany, assignor to Rheinstahl Henschel A.G., Kassel, Germany, a corporation of Germany
Filed Mar. 21, 1966, Ser. No. 536,063
Claims priority, application Germany, Nov. 5, 1963, H 50,744
4 Claims. (Cl. 89—36)

ABSTRACT OF THE DISCLOSURE

This invention relates to a veiwing system for a combat vehicle having a heavy weapon mounted thereon in a rotatable turret which comprises a viewing portion of a periscope mounted in the turret roof, means connecting the viewing portion to eyepiece means within the turret, and transmission means connected to the viewing portion whereby the latter is counter-rotated with respect to the rotating turret and the driver in the turret has a field of view which is always in the same direction with reference to the vehicle.

---

Figure 1:
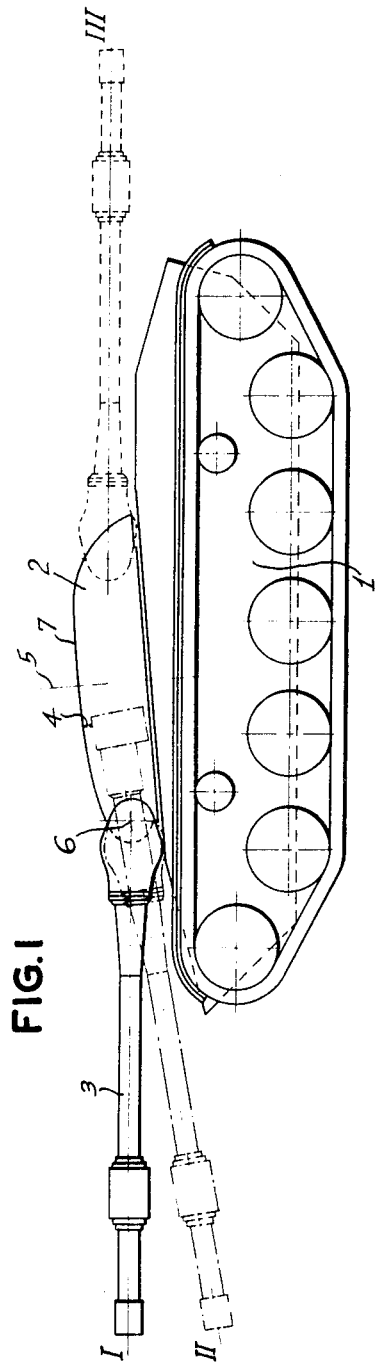

This application is a continuation-in-part of copending application Ser. No. 418,368, filed Nov. 2, 1964, now Patent No. 3,269,269.

The present invention relates to a combat vehicle, particularly of armored construction, having for example, either tracks or an all-wheeled drive and a heavy weapon, preferably a cannon, mounted thereon. As is known, it is required that such vehicles have a high ground clearance combined with a low over-all height or silhouette. It is also required that the cannon be mounted on the vehicle in as low a position as possible in order to absorb the considerable recoil forces inherent in large caliber flat-trajectory weapons, yet without the effect being thereby produced of vehicle movements which are unduly large. In the known construction of such vehicles having a turret in which a weapon is mounted, difficulties arise in meeting the aforementioned requirements because the high-powered engines required in such vehicles, the transmission and steering mechanism necessitate an over-all height of the vehicle body or superstructure which is too great. As a result, the turret in conventional constructions is mounted in such a high position that the over-all height of the vehicle and the height of the muzzle above the ground becomes too great.

In the present invention, a combat vehicle construction is provided which eliminates the drawbacks and disadvantages mentioned above. In the construction of the present invention, the turret which contains the heavy weapon is mounted on the vehicle with an axis of rotation which is slightly forwardly inclined with respect to the vertical, so that it is seated on the vehicle in as low a position as possible in the front portion thereof whereas the rear portion of the rotary turret is provided at a higher position; thus, there is sufficient height in the rear portion of the vehicle body or superstructure to accommodate the power plant and associated driving equipment. Simultaneously, a minimum muzzle height of the weapon is obtained by this construction for the most frequently used portion of the lateral alignment range in which the weapon deviates from the directly forward position by about ±30° at the most. Further, as a result of the forwardly inclined axis of rotation of the turret within the aforementioned aligning range, a low position of the trunnion of the weapon is attained and thereby the roof of the turret may have a low silhouette without reducing the elevation alignment range of the weapon, when firing at a depressed angle towards the front of the vehicle, to as great an extent as is the case in conventional constructions. Another significant advantage of the construction of the present invention, as compared with other constructions of the low silhouette, is that the turret is mounted so that the weapon can be rotated through a full 360°. Further, the vehicle can be driven with the weapon rotated to the rearward position whereby the barrel thereof will be carried in a position higher than it would be in the front of the vehicle and, thus, the danger of the barrel striking the ground while the vehicle is traversing rough terrain is greatly reduced, particularly as compared to those constructions in which the weapon must point forwardly when the vehicle is not traveling in a condition of combat readiness. Also, the weapon can be fired when it is pointed toward the rear of the vehicle although in this case, the elevation alignment range is somewhat reduced at depressed angles of firing.

If the vehicle is equipped with vertically adjustable suspensions, whereby the vehicle superstructure may be adjusted or aligned in the suspended position, either forwardly or rearwardly, then the elevation alignment range is increased beyond the normal extent, both for firing in the forward and rearward directions. As a result, the aforementioned reduction in the elevation alignment range at depressed angles of firing, when firing in the rearward direction, is either completely eliminated or eliminated to even more than the required degree.

For the purpose of compensating for any lateral tilting of the vehicle superstructure caused, for example, by rough terrain and for purposes of increasing the elevation alignment range transversely to the longitudinal direction of the vehicle, the vertically adjustable wheel suspension mentioned above should be separately aligned with respect to each other and in a manner such that the vehicle superstructure can be inclined about the longitudinal axis thereof.

In order to eliminate the primary disadvantage of the vehicle construction described herein, i.e., the inability to accommodate the driver in the underframe or superstructure because of the low height thereof, the driver is acccommodated in the turret and the driver's visual means, i.e., the driver's periscope, is mounted in the turret roof. Ordinarily, this would produce the problem that the driver and his periscope would rotate with the turret and the driver would at times thereby be deprived of a view in the driving direction. This is overcome in the present invention by mounting the viewing portion of the driver's periscope in a manner such that it is counter-rotated with respect to the turret, during the rotations of the latter, from that portion of the turret which is rigid with the vehicle, for example, by means of a mechanical, electrical, or hydraulic transmission in a manner such that the driver will always look in the forward direction, with reference to the vehicle. The construction of the present invention also provides that the viewing portion of the driver's periscope is reversed in a manner such that when driving the vehicle in reverse gear or after reversing, the driver will have a view in the reversed direction with reference to the vehicle without having to change his position in the vehicle specifically for that purpose. When reversing the viewing portion of the driver's periscope from forward to reverse gear in this manner, it may be advantageous to simultaneously shift or actuate a lateral reversing device from left to right. This possibility of a lateral reversal exists since the driver is able to read indicator boards in a normal manner.

The driver's periscope as well as, if desired, the optical system of the vehicle commander for observation and/or for target direction are stabilized in known manner, preferably by means of gyroscopes, so that all of the rotary movements of the vehicle are compensated for, at least about the vertical axis thereof, and a stationary image is obtained. Depending upon the type of terrain, it may also be advantageous not to stabilize the driver's periscope azimuthally but to employ instead the above-described connection with the rotation of the turret, if desired with the inclusion of the reversal of the viewing portion of the driver's periscope from forward to reverse gear.

Figure 2:
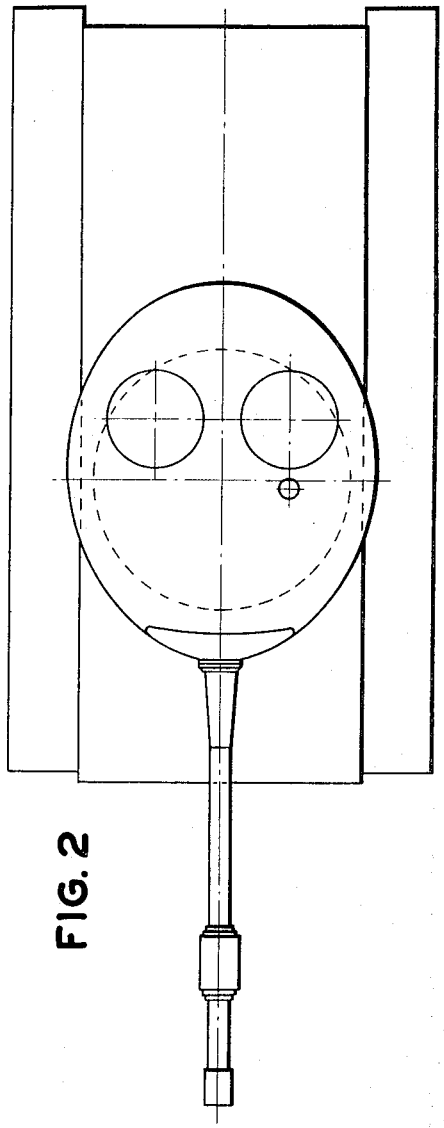

The invention will be further illustrated by reference to the accompanying drawings in which FIGURE 1 is a view in elevation of an armored combat vehicle having a tracked drive and cannon installed in a turret thereon, FIGURE 2 is a top view of the vehicle of FIGURE 1, FIGURE 3 is a fragmentary sectional view of the transmission means for counter-rotating the viewing portion of the periscope relative to the rotating turret, and FIGURE 4 is a schematic top view showing two positions of a driver in the turret, the two positions being with the turret rotated 45° apart.

In the drawings, the reference numeral 1 designates the combat vehicle having tracks thereon. A turret 2 is mounted on the vehicle superstructure and has a forwardly inclined axis of rotation 5. In the positions I and II of the cannon 3 shown in FIGURE 1 for firing in the forward direction, the trunnion 6 of the cannon is accommodated in a low position as a result of the angularly mounted or inclined turret. The distance 4 between the breech of the cannon and the roof 7 of the turret remains and is sufficient for firing the cannon at depressed angles in the forward direction, i.e., position II shown in phantom, despite the low mounting or silhouette of the roof 7 of the turret. In position III of the cannon, shown in phantom, for firing in the rearward direction, on the other hand, the corresponding distance 4 between the breech of the cannon and the roof 7 of the turret is reduced, whereby the elevation alignment range at depressed angles of firing is also reduced.

Referring to FIGURE 3, a ring gear 8 mounted on the armored superstructure of the vehicle engages with a pinion 9 which rotates when the turret 2 is rotated. The driving force of the pinion 9 is transmitted, by means of a drive shaft or universal joint drive shaft 10, to the pinion 11 which is mounted below the turret roof and engages with a ring gear 12, which latter is connected for rotation with the rotatable viewing portion 13 of a periscope. Thus, during rotation of the turret, the viewing portion 13 of the periscope will always point in the forward driving direction.

The lower portion of the periscope includes the eyepieces 14 and is connected to the turret by means of the support 15, which latter is welded, for example. Thus, the driver may occupy a fixed seated position in the turret at all times and the rotation of the rotatable viewing portion 13 permits the driver to look always in the forward driving direction.

FIGURE 4 shows the position of the rotatable viewing portion 13 of the periscope with respect to the driver in two positions of the turret. In both positions of the turret, the viewing portion 13 faces in the driving direction, as shown, even though the turret is shown rotated 45° between the two positions.

It will be obvious to those skilled in the art that many modifications may be made within the scope of the present invention without departing from the spirit thereof, and the invention includes all such modifications.

What is claimed is:

1. A viewing system for a combat vehicle having a heavy weapon mounted thereon in a rotatable turret which comprises a viewing portion of a periscope mounted in the turret roof, means connecting the viewing portion to eyepiece means within the turret, and transmission means connected to the viewing portion whereby the latter is counter-rotated with respect to the rotating turret and a driver in the turret has a field of view which is always in the same direction with reference to the vehicle.

2. A viewing system according to claim 1 in which the transmission means includes a first ring gear in the turret connected to the viewing portion and a shaft with a pair of pinions thereon connecting the first ring gear to a second ring gear on the vehicle superstructure.

3. A viewing system according to claim 1 in which the turret is rotatable through 360°.

4. A viewing system according to claim 1 in which the turret is mounted on the vehicle with a forwardly inclined axis of rotation, with reference to the vertical, whereby the structural height of the rearward portion of the vehicle is sufficient to accommodate an engine and related equipment.

References Cited

UNITED STATES PATENTS

| | | | |
|---|---|---|---|
| 815,657 | 3/1906 | Swasey | 350—23 |
| 1,229,869 | 6/1917 | Blacksher. | |
| 2,103,858 | 12/1937 | Luschinsky | 350—302 X |
| 2,546,111 | 3/1951 | Rattray | 350—23 X |
| 3,269,269 | 8/1966 | Kunze | 89—36 |

SAMUEL W. ENGLE, *Primary Examiner.*

SAMUEL FEINBERG, *Examiner.*

S. C. BENTLEY, *Assistant Examiner.*